(12) United States Patent
Tamaru et al.

(10) Patent No.: US 11,694,705 B2
(45) Date of Patent: Jul. 4, 2023

(54) SOUND SIGNAL PROCESSING SYSTEM APPARATUS FOR AVOIDING ADVERSE EFFECTS ON SPEECH RECOGNITION

(71) Applicant: Sony Interactive Entertainment Inc., Tokyo (JP)

(72) Inventors: Yoshihiko Tamaru, Kanagawa (JP); Tetsuro Horikawa, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 56 days.

(21) Appl. No.: 17/261,126

(22) PCT Filed: Jul. 16, 2019

(86) PCT No.: PCT/JP2019/027982
§ 371 (c)(1),
(2) Date: Jan. 18, 2021

(87) PCT Pub. No.: WO2020/017517
PCT Pub. Date: Jan. 23, 2020

(65) Prior Publication Data
US 2021/0264933 A1    Aug. 26, 2021

(30) Foreign Application Priority Data
Jul. 20, 2018  (JP) ................................. 2018-136886

(51) Int. Cl.
*G10L 21/0208*    (2013.01)
*G10L 15/20*    (2006.01)
(Continued)

(52) U.S. Cl.
CPC .......... *G10L 21/0208* (2013.01); *G10L 15/20* (2013.01); *G10L 25/60* (2013.01); *G10L 25/84* (2013.01); *G10L 2021/02163* (2013.01)

(58) Field of Classification Search
None
See application file for complete search history.

(56) References Cited

U.S. PATENT DOCUMENTS

| 5,648,660 A * | 7/1997 | Lee ................... H01L 27/14654 348/E5.081 |
| 8,886,524 B1 * | 11/2014 | Watanabe .............. H04R 3/002 704/201 |

(Continued)

FOREIGN PATENT DOCUMENTS

| CN | 103177723 A | 6/2013 |
| CN | 103813239 A | 5/2014 |

(Continued)

OTHER PUBLICATIONS

International Search Report for corresponding PCT Application No. PCT/JP2019/027982, 2 pages, dated Oct. 1, 2019.

(Continued)

*Primary Examiner* — Shaun Roberts
(74) *Attorney, Agent, or Firm* — Matthew B. Dernier, Esq.

(57) ABSTRACT

A sound signal processing system includes: a sound signal processing apparatus executing non-linear signal processing on a collected sound signal collected by a microphone, and transmitting, to an information processing apparatus, both a pre-execution sound signal before the non-linear signal processing is executed and a post-execution sound signal after the non-linear signal processing is executed; and the information processing apparatus receiving the pre-execution sound signal and the post-execution sound signal from the sound signal processing apparatus, and executing first processing on the pre-execution sound signal and executing second processing on the post-execution sound signal, the second processing being different from the first processing.

9 Claims, 5 Drawing Sheets

(51) Int. Cl.
*G10L 25/60* (2013.01)
*G10L 25/84* (2013.01)
*G10L 21/0216* (2013.01)

(56) References Cited

U.S. PATENT DOCUMENTS

| | | | | |
|---|---|---|---|---|
| 10,397,700 | B2* | 8/2019 | Thyssen | G10L 21/0232 |
| 2009/0285408 | A1* | 11/2009 | Kimura | G10K 11/17885 |
| | | | | 381/71.6 |
| 2009/0326939 | A1* | 12/2009 | Toner | H04M 3/42391 |
| | | | | 704/235 |
| 2013/0141516 | A1* | 6/2013 | Baldwin | G10L 15/22 |
| | | | | 704/E21.001 |
| 2014/0243048 | A1* | 8/2014 | Kwan | G10L 21/0208 |
| | | | | 381/71.11 |
| 2014/0307888 | A1* | 10/2014 | Alderson | G10K 11/1783 |
| | | | | 381/71.8 |
| 2014/0348327 | A1* | 11/2014 | Linde | H04H 20/88 |
| | | | | 381/2 |
| 2016/0358602 | A1* | 12/2016 | Krishnaswamy | G10L 15/20 |
| 2017/0021785 | A1* | 1/2017 | Lim | B60R 16/0373 |

FOREIGN PATENT DOCUMENTS

| | | |
|---|---|---|
| JP | 2014116930 A | 6/2014 |
| WO | 2014141574 A1 | 9/2014 |
| WO | 2016127506 A1 | 8/2016 |
| WO | 2017056288 A1 | 4/2017 |

OTHER PUBLICATIONS

Office Action for corresponding CN Application No. 201980054439. 3, 7 pages, dated Oct. 8, 2021.
Notice of Reasons for Refusal for corresponding JP Application No. 2020531321, 6 pages, dated Feb. 15, 2022.
International Preliminary Report on Patentability and Written Opinion for corresponding PCT Application No. PCT/JP2019/027982, 11 pages, dated Feb. 4, 2021.

* cited by examiner

SOUND SIGNAL PROCESSING SYSTEM APPARATUS FOR AVOIDING ADVERSE EFFECTS ON SPEECH RECOGNITION

TECHNICAL FIELD

The present invention relates to a sound signal processing system, a sound signal processing apparatus, an information processing apparatus, and a sound signal processing method that process a sound signal collected by a microphone.

BACKGROUND ART

A sound signal processing system including a microphone that collects sound is known. Such a sound signal processing system executes speech recognition processing on a sound signal collected by the microphone or transmits the sound signal to another communication device so as to be reproduced outside.

SUMMARY

Technical Problem

In some cases, sound signal processing such as echo removal processing is desired to be applied to a sound signal obtained by the microphone. However, the accuracy of the speech recognition processing may be, in some cases, adversely affected depending on the type of sound signal processing applied.

The present invention has been made in view of the circumstances above. One of objects of the present invention is to provide a sound signal processing system, a sound signal processing apparatus, an information processing apparatus, and a sound signal processing method that can avoid adverse effects on speech recognition processing while applying necessary sound signal processing.

Solution to Problem

A sound signal processing system according to the present invention includes a sound signal processing apparatus and an information processing apparatus configured to be communicatively connected to each other, in which the sound signal processing apparatus includes a signal processing section configured to execute non-linear signal processing on a collected sound signal collected by a microphone, and a transmission section configured to transmit, to the information processing apparatus, both a pre-execution sound signal before the non-linear signal processing is executed and a post-execution sound signal after the non-linear signal processing is executed, and the information processing apparatus includes a reception section configured to receive the pre-execution sound signal and the post-execution sound signal from the sound signal processing apparatus, and a processing section configured to execute first processing on the pre-execution sound signal and execute second processing on the post-execution sound signal, the second processing being different from the first processing.

A sound signal processing apparatus according to the present invention is configured to be communicatively connected to an information processing apparatus and includes: a signal processing section configured to execute non-linear signal processing on a collected sound signal collected by a microphone; and a transmission section configured to transmit, to the information processing apparatus, both a pre-execution sound signal before the non-linear signal processing is executed and a post-execution sound signal after the non-linear signal processing is executed.

An information processing apparatus according to the present invention is configured to be communicatively connected to a sound signal processing apparatus and includes: a reception section configured to receive, from the sound signal processing apparatus, both a pre-execution sound signal before non-linear signal processing is executed on a collected sound signal collected by a microphone and a post-execution sound signal after the non-linear signal processing is executed on the collected sound signal; and a processing section configured to execute first processing on the pre-execution sound signal and execute second processing on the post-execution sound signal, the second processing being different from the first processing.

A sound signal processing method according to the present invention includes: a step of executing non-linear signal processing on a collected sound signal collected by a microphone; and a step of transmitting, to an information processing apparatus, both a pre-execution sound signal before the non-linear signal processing is executed and a post-execution sound signal after the non-linear signal processing is executed.

DESCRIPTION OF EMBODIMENT

Hereinafter, an embodiment of the present invention will be described in detail with reference to the drawings.

Figure 1:
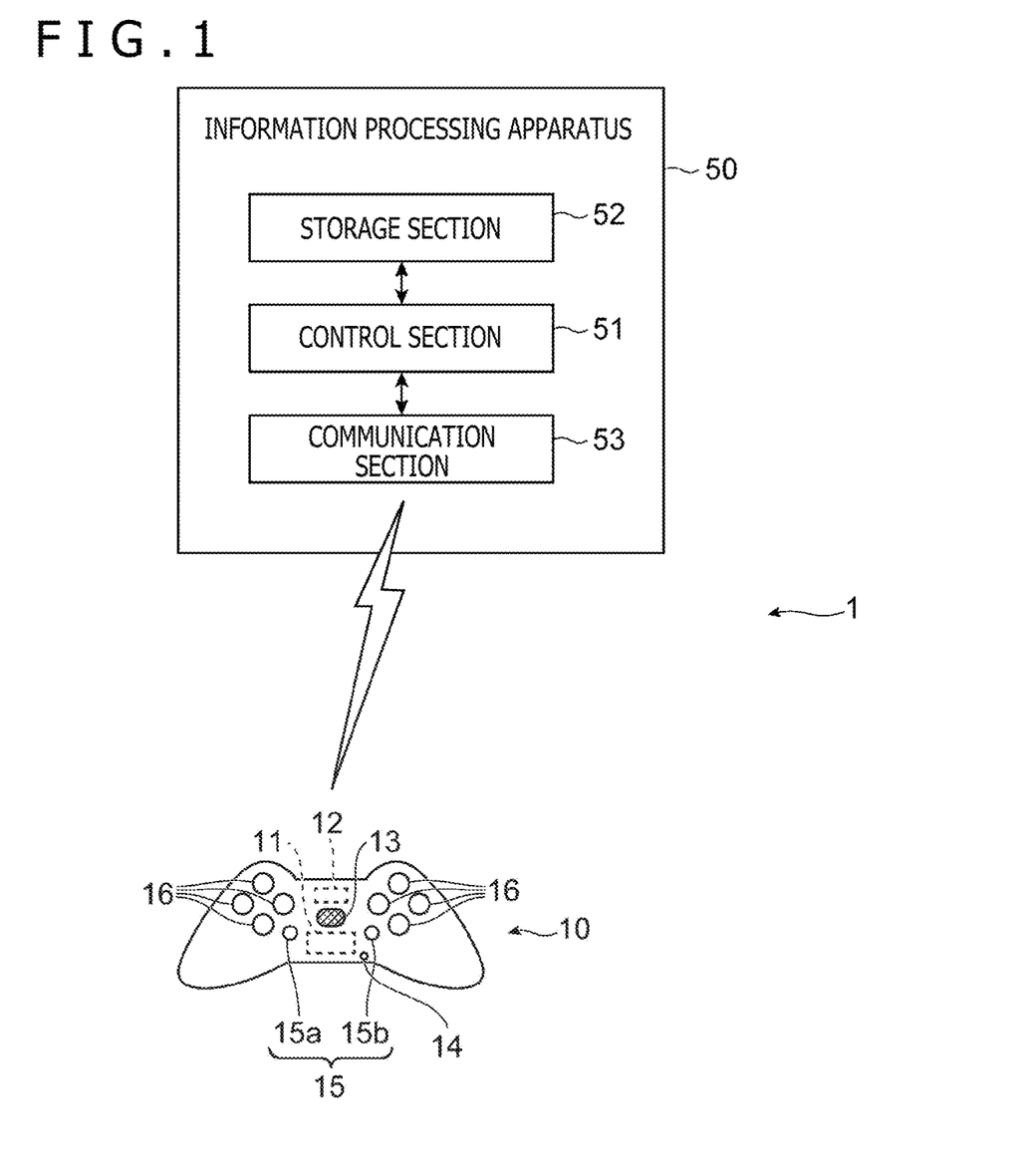
FIG. 1 is an overall configuration diagram of a sound signal processing system including a sound signal processing apparatus according to an embodiment of the present invention.

FIG. 1 is an overall configuration diagram of a sound signal processing system 1 including a sound signal processing apparatus 10 according to the embodiment of the present invention. As illustrated in the figure, the sound signal processing system 1 includes the sound signal processing apparatus 10 and an information processing apparatus 50. In the present embodiment, the sound signal processing apparatus 10 and the information processing apparatus 50 transmit and receive data through wireless communication such as the Bluetooth (registered trademark) standard. It is noted that although data is transmitted and received through wireless communication here, the present embodiment is not limited thereto, and the sound signal processing apparatus 10 and the information processing apparatus 50 may be connected through wired communication according to a standard such as a universal serial bus (USB), for example.

Figure 2:
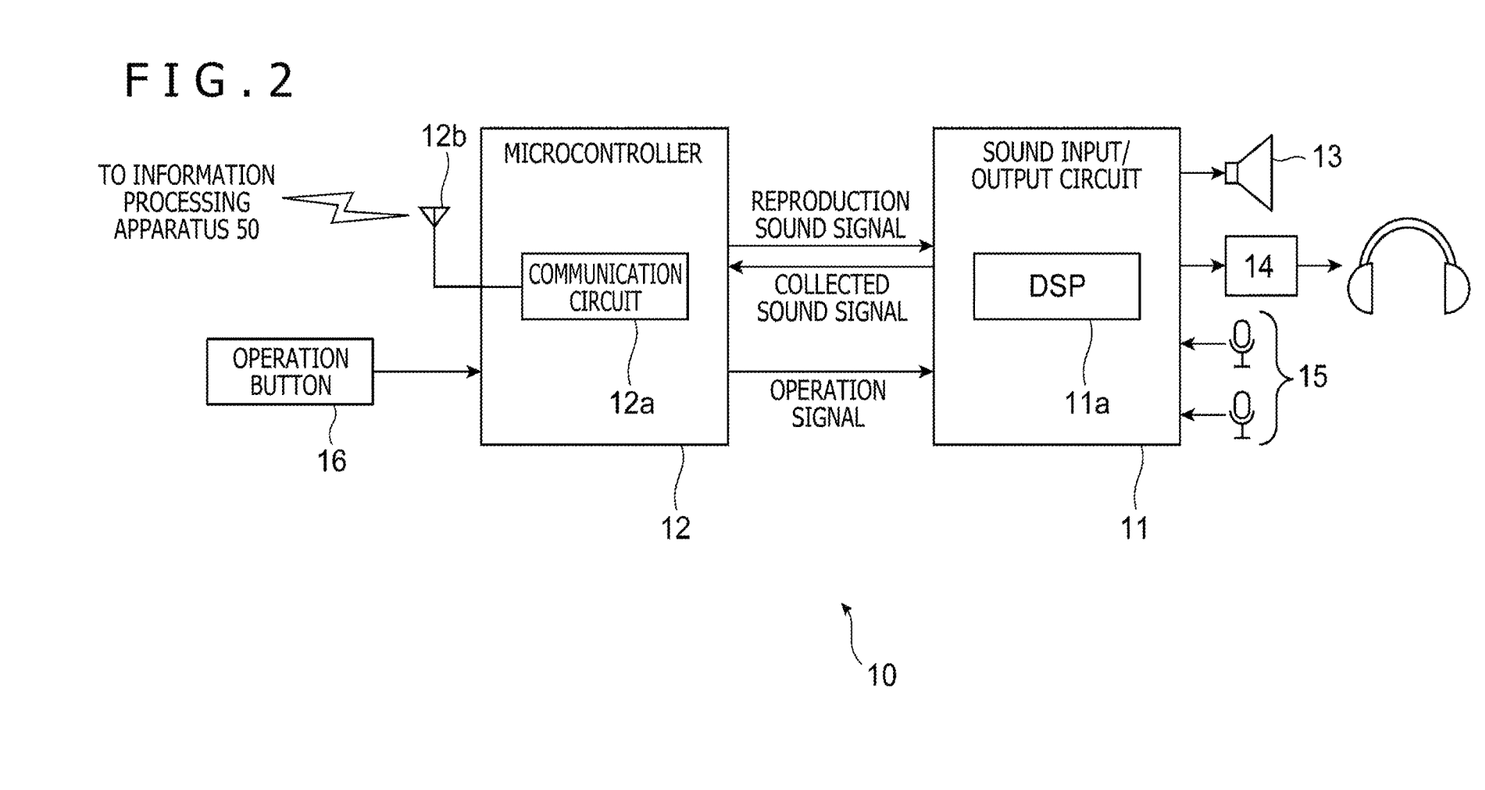
FIG. 2 is a configuration block diagram of the sound signal processing apparatus according to the embodiment of the present invention.

FIG. 2 is a configuration block diagram illustrating a schematic hardware configuration of the sound signal processing apparatus 10. The sound signal processing apparatus 10 is, for example, a controller for a home-use game machine, or the like. As illustrated in FIG. 2, the sound signal processing apparatus 10 includes a sound input/output circuit 11, a microcontroller 12, a speaker 13, a headphone terminal 14, a microphone 15, and a plurality of operation buttons 16.

The sound input/output circuit 11 is an integrated circuit for controlling the input and output of sound and includes a built-in digital signal processor (DSP) 11a, which executes sound signal processing. The sound input/output circuit 11 causes either headphones connected to the headphone terminal 14 or the speaker 13 to produce sound on the basis of a sound signal that the microcontroller 12 has received from the information processing apparatus 50. Further, the sound input/output circuit 11 executes necessary sound signal processing on a sound signal obtained by collecting sound with the microphone 15. After that, the sound input/output circuit 11 outputs the sound signal to the microcontroller 12. Further, in a case where each operation button 16 is operated by the user, the sound input/output circuit 11 receives an operation signal, which indicates the contents of the operation, from the microcontroller 12 to execute noise removal processing described later. The details of the sound signal processing realized by the sound input/output circuit 11 will be described later.

The microcontroller 12 is an integrated circuit for controlling each section of the sound signal processing apparatus 10. The microcontroller 12 includes a built-in communication circuit 12a. The communication circuit 12a is connected to an antenna 12b and controls wireless communication for exchanging information with the information processing apparatus 50 via the antenna 12b. Specifically, the communication circuit 12a receives, from the information processing apparatus 50, a sound signal to be reproduced from the speaker 13 or the headphones described later. Further, the communication circuit 12a transmits, to the information processing apparatus 50, a sound signal obtained by applying sound signal processing described later to a sound signal collected by the microphone 15, an operation signal indicating the contents of the user's operation on the corresponding operation button 16, and the like. It is noted that the microcontroller 12 may include a communication interface based on a standard such as I2S (Inter-IC Sound) as an interface for transmitting and receiving a sound signal to and from the sound input/output circuit 11.

The speaker 13 monaurally reproduces sound based on a sound signal received from the information processing apparatus 50. Both headphones supporting monaural reproduction and headphones supporting stereo reproduction can be connected to the headphone terminal 14. In a case where headphones are connected to the headphone terminal 14, the sound input/output circuit 11 can cause the headphones, instead of the speaker 13, to reproduce sound based on a sound signal received from the information processing apparatus 50. The microphone 15 is a microphone array including two microphone elements 15a and 15b and collects voice uttered by the user who is using the sound signal processing apparatus 10. Hereinafter, a sound signal transmitted from the information processing apparatus 50 to the sound signal processing apparatus 10 in order to be reproduced from the speaker 13 or the headphones will be referred to as a reproduction sound signal. By contrast, a sound signal obtained by collecting sound with the microphone 15 will be referred to as a collected sound signal.

The information processing apparatus 50 is, for example, a home-use game machine, a personal computer, or the like, and includes a control section 51, a storage section 52, and a communication section 53.

The control section 51 includes at least one processor and executes various types of information processing according to a program stored in the storage section 52. The storage section 52 includes at least one storage element and stores the program to be executed by the control section 51 and data to be processed by the program. The communication section 53 includes a communication interface for exchanging information with the sound signal processing apparatus 10. Further, the communication section 53 may include a communication interface for transmitting and receiving data to and from another information processing apparatus via a communication line such as the Internet.

In the present embodiment, the information processing apparatus 50 executes speech recognition processing on a collected sound signal received from the sound signal processing apparatus 10. Further, the information processing apparatus 50 transmits a collected sound signal received from the sound signal processing apparatus 10 to another information processing apparatus to reproduce the collected sound signal at another place. Accordingly, the information processing apparatus 50 can identify the language contents uttered by the user toward the microphone 15 of the sound signal processing apparatus 10 and enable another user to listen to the voice at a distant place.

Figure 3:
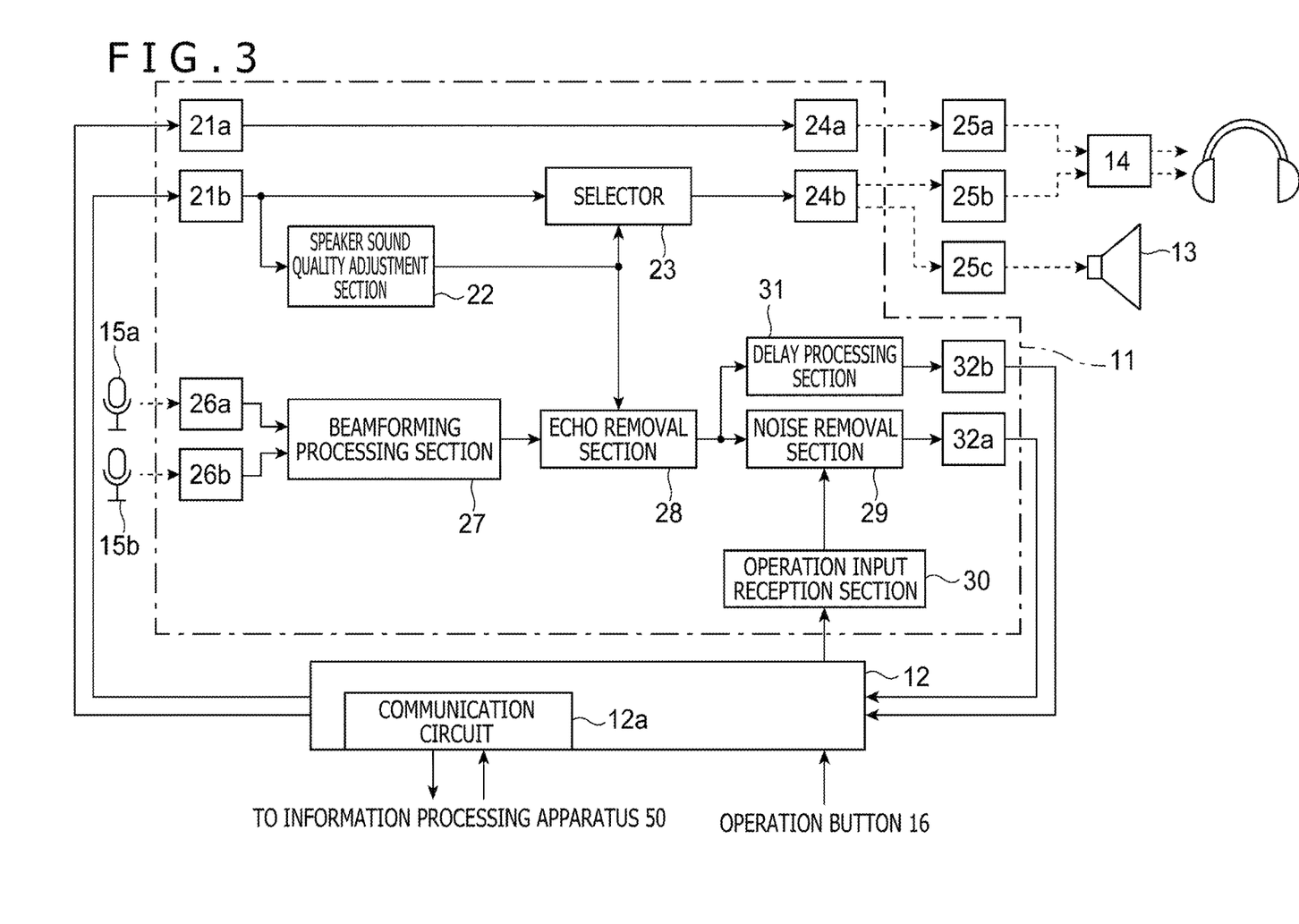
FIG. 3 is a functional block diagram of the sound signal processing apparatus according to the embodiment of the present invention.

Functions implemented by the sound signal processing apparatus 10 in terms of the sound signal processing in particular will be described below with reference to a functional block diagram of FIG. 3. In FIG. 3, a transmission path of a digital sound signal and a transmission path of an analog sound signal are denoted by a solid line and a broken line, respectively.

As illustrated in FIG. 3, the sound input/output circuit 11 includes two signal input sections 21a and 21b, a speaker sound quality adjustment section 22, a selector 23, two digital-to-analog (D/A) converters 24a and 24b, and two analog-to-digital (A/D) converters 26a and 26b, a beamforming processing section 27, an echo removal section 28, a noise removal section 29, an operation input reception section 30, a delay processing section 31, and two signal output sections 32a and 32b. Further, three amplifiers 25a, 25b, and 25c are connected to the sound input/output circuit 11. Functions of the speaker sound quality adjustment section 22, the selector 23, the beamforming processing section 27, the echo removal section 28, the noise removal section 29, the operation input reception section 30, and the delay processing section 31 are implemented by the DSP 11a, which is a sound signal processing circuit.

First, the contents of signal processing for the sound signal processing apparatus 10 to reproduce sound from the headphones or the speaker 13 will be described. The information processing apparatus 50 transmits stereo (two-channel) digital data to the sound signal processing apparatus 1 as a reproduction sound signal. The communication circuit 12a receives these digital data and inputs L-(left) channel data and R-(right) channel data into the signal input section 21a and the signal input section 21b, respectively.

The L-channel reproduction sound signal input into the signal input section 21a is input into the D/A converter 24a as it is. Meanwhile, the R-channel reproduction sound signal input into the signal input section 21b is input into the selector 23 and the speaker sound quality adjustment section 22. In a case where the headphones are not connected to the headphone terminal 14 (that is, in a case where the sound is reproduced from the speaker 13), the speaker sound quality adjustment section 22 executes processing for improving the sound quality of the sound to be reproduced from the speaker 13. Specifically, the speaker sound quality adjustment section 22 executes predetermined equalizer processing, compressor processing, and the like on the reproduction sound signal. The reproduction sound signal adjusted by the speaker sound quality adjustment section 22 is input into each of the selector 23 and the echo removal section 28 described later.

The selector 23 selects the reproduction sound signal to be supplied to the D/A converter 24b. Specifically, in a case where the headphones are connected to the headphone terminal 14, the selector 23 inputs the R-channel reproduction sound signal, which has been input into the signal input section 21b, into the D/A converter 24b as it is. By contrast, in a case where the headphones are not connected to the headphone terminal 14, the selector 23 inputs the reproduction sound signal, which has been adjusted by the speaker sound quality adjustment section 22 to be reproduced from the speaker 13, into the D/A converter 24b.

The D/A converters 24a and 24b convert the respective input digital reproduction sound signals into analog signals and supply the analog signals to the respective amplifiers. Specifically, the analog sound signal output from the D/A converter 24a is amplified by the amplifier 25a and reproduced from the headphones connected to the headphone terminal 14. Further, the analog sound signal output from the D/A converter 24b is amplified by the amplifier 25b and reproduced from the headphones in a case where the headphones are connected to the headphone terminal 14. In a case where no headphones are connected to the headphone terminal 14, the analog sound signal output from the D/A converter 24b is amplified by the amplifier 25c and reproduced from the speaker 13.

It is noted that in a case where the headphones connected to the headphone terminal 14 support monaural reproduction, the L-channel reproduction sound signal may be reproduced from the headphones while the R-channel reproduction sound signal may be reproduced from the speaker 13 at the same time. In this case, even if the headphones are connected to the headphone terminal 14, the selector 23 selects the reproduction sound signal adjusted by the speaker sound quality adjustment section 22 as an input.

In summary, the reproduction sound signal input into the signal input section 21a is always reproduced from the headphones connected to the headphone terminal 14 via the D/A converter 24a and the amplifier 25a. By contrast, the reproduction sound signal input into the signal input section 21b is processed along one of the following two paths. That is, in a case where the headphones supporting stereo reproduction are connected to the headphone terminal 14, the reproduction sound signal input into the signal input section 21b is reproduced from the headphones via the selector 23, the D/A converter 24b, and the amplifier 25b. By contrast, in a case where the sound is reproduced from the speaker 13, the reproduction sound signal input into the signal input section 21b is reproduced from the speaker 13 via the speaker sound quality adjustment section 22, the selector 23, the D/A converter 24b, and the amplifier 25c.

Next, processing of collected sound signals collected by the microphone 15 will be described. Analog collected sound signals output from the respective microphone elements 15a and 15b are converted into digital data by the A/D converters 26a and 26b. The beamforming processing section 27 generates data of a collected sound signal having directivity on the basis of data of the collected sound signals output from the respective A/D converters 26a and 26b. In the subsequent processing, the data of the collected sound signal generated by the beamforming processing section 27 is used as data of the sound collected by the microphone 15.

Moreover, the echo removal section 28 executes echo removal processing on the data of the collected sound signal generated by the beamforming processing section 27. This is processing of removing, from the collected sound signal, acoustic echo generated by the microphone 15 collecting sound reproduced from the speaker 13. The echo removal section 28 executes echo removal processing on the collected sound signal by using, as an input, a reproduction sound signal output from the speaker sound quality adjustment section 22 so as to be reproduced from the speaker. The collected sound signal on which the echo removal processing has been executed by the echo removal section 28 is input into each of the noise removal section 29 and the delay processing section 31.

It is noted that the echo removal section 28 just needs to execute the echo removal processing only in a case where the sound is being reproduced from the speaker 13. In a case where the reproduction sound signal output from the D/A converter 24b is being reproduced from the headphones, the echo removal section 28 does not need to execute the echo removal processing. In a case where the sound is reproduced from the speaker 13, the sound is always adjusted by the speaker sound quality adjustment section 22. Therefore, only while the speaker sound quality adjustment section 22 is executing adjustment processing, the echo removal section 28 may execute the echo removal processing using the adjusted sound signal as an input, and in other cases, the echo removal section 28 may output an input collected sound signal as it is.

Each sound signal processing (that is, the sound signal processing executed by each of the beamforming processing section 27 and the echo removal section 28) on a collected sound signal described above is linear signal processing. By contrast, the noise removal processing described below is non-linear signal processing.

The noise removal section 29 executes the noise removal processing for removing noise from the collected sound signal with echo removed, which has been output from the echo removal section 28. In particular, in the present embodiment, the noise removal section 29 executes the noise removal processing by using, as an input, the presence/absence of the user's operation input into any operation button 16. In a case where the operation input is performed on any operation button 16, there is a possibility that an operation sound of the button is generated and the operation sound is included in the collected sound signal as noise. Therefore, in the present embodiment, in a case where the user performs an operation input into any operation button 16, the microcontroller 12 inputs an operation signal into the sound input/output circuit 11. The operation signal indicates that the operation input has been made. The operation input reception section 30 receives the operation signal and notifies the noise removal section 29 that the operation input has been received. In a case where the noise removal section 29 receives the notification from the operation input reception section 30, the noise removal section 29 executes processing of removing noise on the assumption that the sound signal collected at that timing includes the noise.

By contrast, at the timing when the operation input is not received, it is assumed that noise caused by the operation of the operation button is not generated. Therefore, the noise removal section 29 may not apply the noise removal processing to the sound signal collected at this timing. However, there is a possibility that the collected sound signal includes noise other than the operation sound of the operation button 16. Therefore, it is desirable that the noise removal section 29 apply the noise removal processing to the collected sound signal for a case where the operation input is not received. The contents of the noise removal processing executed for this case are different from that for a case where the operation input is received. That is, the noise removal section 29 changes the contents of the noise removal processing depending on whether the operation input into any operation button 16 is received.

Figure 4:
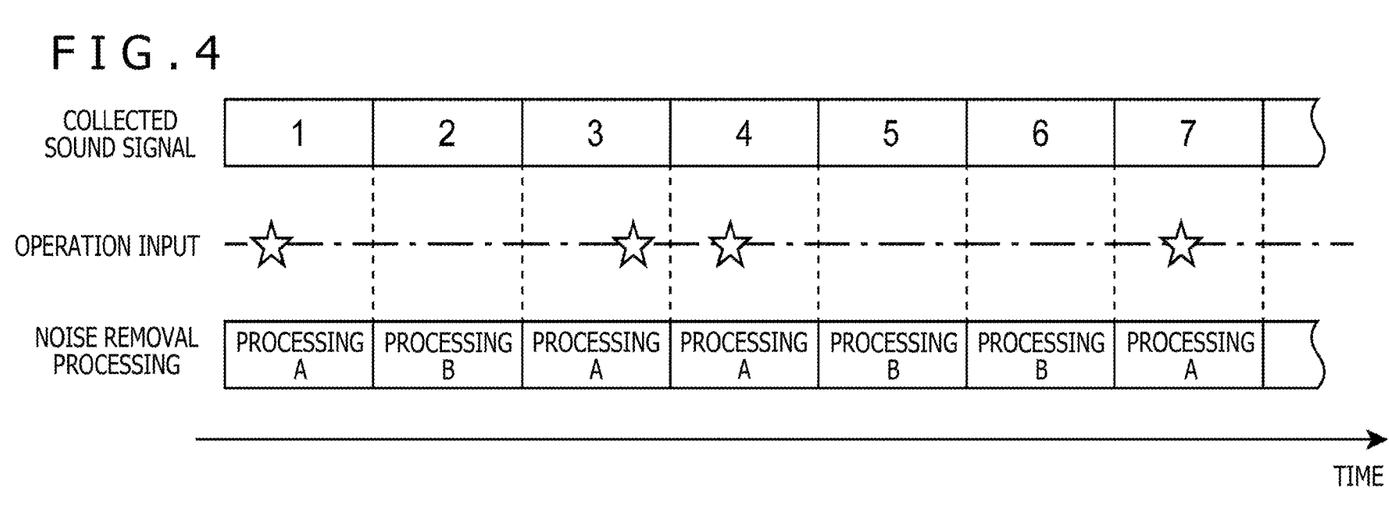
FIG. 4 is a diagram for describing noise removal processing executed by the sound signal processing apparatus according to the embodiment of the present invention.

FIG. 4 is a diagram for describing the types of the noise removal processing executed by the noise removal section 29. As illustrated in this figure, the noise removal section 29 divides a collected sound signal into unit time (frame) and executes the noise removal processing on the divided sound signal in each unit time. At this time, the contents of the noise removal processing change depending on whether the operation input is received within the corresponding unit time. In the example of this figure, an asterisk indicates the timing when the operation input into the operation button 16 is received. The noise removal processing (referred to as processing A here), which assumes the operation input, is executed on the collected sound signal in each of frames 1, 3, 4, and 7 corresponding to this timing. By contrast, the noise removal processing (referred to as processing B here) for a case where no operation input is performed is executed on the collected sound signal in each of frames 2, 5, and 6.

As a specific example, the noise removal section 29 may execute the noise removal processing using a filter algorithm optimized on the basis of input data different from each other depending on the presence/absence of the operation input. In this example, the noise removal section 29 adjusts a value of one or a plurality of parameters that determine the processing contents of the processing A described above by using, as an input, the collected sound signal acquired at the timing when the operation input is received. By contrast, the noise removal section 29 adjusts a value of one or a plurality of parameters that determine the processing contents of the processing B by using, as an input, the collected sound signal acquired at the timing when the operation input is not received. Since the inputs are different, the parameter(s) used for the processing A and the parameter(s) used for the processing B are adjusted to values different from each other. The noise removal section 29 uses the parameter(s) adjusted for each processing in this manner to execute the corresponding noise removal processing. In this manner, the noise removal section 29 executes the noise removal processing by using the result of optimization, which is performed on the basis of the past collected sound signal and independent of each other depending on the presence/absence of the operation input. Noise removal suitable for each situation can be realized in this manner.

It is noted that, here, the contents of the processing are changed simply on the basis of the presence/absence of the operation input into one of the operation buttons 16 without identifying which operation button has been operated among the plurality of operation buttons 16. However, the present embodiment is not limited thereto and the noise removal section 29 may change the contents of the noise removal processing depending on the contents of the operation input. As an example, the noise removal section 29 may receive information for identifying which operation button among the plurality of operation buttons 16 has been operated, and execute noise removal processing whose contents vary depending on the operation button.

Further, the noise removal section 29 may classify the plurality of operation buttons 16 into a plurality of groups and change the contents of the noise removal processing for each group. For example, generated operation sound may, in some cases, vary depending on the type and structure of the operation button. Further, it is assumed that the volume or the like of the operation sound collected by the microphone 15 varies depending on whether the arrangement position of the operation button is close to or far from that of the microphone 15. Therefore, any operation buttons in similar arrangement positions and structures belong to the same group. In a case where any of the operation buttons belonging to this group is operated, the noise removal processing whose contents correspond to that group is applied. By contrast, in a case where any of the operation buttons belonging to a different group from the other is operated, the noise removal processing whose contents are different is executed. Specifically, for example, the noise removal section 29 executes the noise removal processing using one or a plurality of parameters optimized on the basis of input data that varies depending on the group. In this manner, the noise removal section 29 can increase the accuracy of the noise removal processing by classifying the operation buttons into a plurality of groups depending on the arrangement position, the shape, and the like, and executing the noise removal processing whose contents are different from each other depending on the group.

Further, although, here, the operation input reception section 30 receives only the operation input into each of the operation buttons 16, the sound signal processing apparatus 10 may be provided with operation members of a different type (e.g., levers or the like) from the operation buttons and the operation input reception section 30 may receive an operation input into such an operation member of the different type. Further, in this case, the noise removal section 29 may change the contents of the noise removal processing depending on the type of the operation member. Accordingly, for each type of the operation member, the noise removal section 29 can execute the noise removal processing that is suitable for noise generated by the operation on the corresponding operation member.

Moreover, the operation input reception section 30 may receive information regarding the user's operation mode against the operation member. On the basis of this information regarding the operation mode, the noise removal section 29 may change the contents of the noise removal processing. The information regarding the operation mode includes the amount of operation, the strength of the operation, the speed of the operation, and the like. For example, in a case where the operation buttons 16 are buttons capable of detecting the amount of depression, the operation input reception section 30 receives the detected amount of depression as information regarding the operation mode. It is assumed that how the operation sound is generated varies depending on the operation mode performed by the user. Therefore, changing the contents of the noise removal processing using the information regarding the operation mode can increase the accuracy of the noise removal processing.

Moreover, the operation input reception section 30 may receive information regarding an operation input of a different type, without limiting to operation inputs into the operation members arranged on the surface of a housing of the sound signal processing apparatus 10. Specifically, the operation input reception section 30 may receive, as the contents of the operation input, a detection value detected by any of various sensors incorporated in the sound signal processing apparatus 10. As an example, assume that a motion sensor such as an acceleration sensor is incorporated in the sound signal processing apparatus 10. In this case, when the user performs an operation of, for example, moving the sound signal processing apparatus 10 itself, the contents of the operation are detected by the motion sensor. In particular, when the user brings the sound signal processing apparatus 10 into contact with any object, the impact generated by the contact is detected by the motion sensor, and, at the same time, its impact sound is collected by the microphone 15. Therefore, in a case where the motion sensor detects an impact having a predetermined strength, the operation input reception section 30 receives its contents as information regarding the operation input. The noise removal section 29 changes the contents of the noise removal processing depending on the input. Accordingly, the noise removal section 29 can effectively remove noise generated by an operation other than operations on the operation members.

Further, the noise removal section 29 may change the contents of the noise removal processing on the basis of not only information regarding the contents of an operation input received by the operation input reception section 30 but also information regarding the usage status of the sound signal processing apparatus 10 received from the information processing apparatus 50. For example, when the user starts using the sound signal processing apparatus 10, the information processing apparatus 50 may, in some cases, execute authentication processing to identify who the user is. The information processing apparatus 50 transmits user identification information obtained as a result of this authentication processing to the sound signal processing apparatus 10. After that, the sound signal processing apparatus 10 executes the noise removal processing using one or a plurality of parameters stored in association with the user identification information and adjusts a value of each parameter stored on the basis of the result. This enables execution of the noise removal processing that reflects the tendency of the user's operation for each user.

Further, the noise removal section 29 may receive information for identifying the type of an application program being executed by the information processing apparatus 50 as information regarding the usage status of the sound signal processing apparatus 10 and change the contents of the noise removal processing depending on the contents of the type of the application program. For example, in a case where the information processing apparatus 50 executes an application program such as a game, the user plays the game by operating the operation buttons 16 arranged on the sound signal processing apparatus 10. At this time, the tendency of operation inputs performed by the user varies depending on the type of the game (e.g., an action game or an adventure game) and the like. Therefore, the contents of the noise removal processing are changed depending on the type of the application program being executed. In this manner, the noise removal processing suited to the tendency of the operation of the application program can be realized.

As described above, the noise removal section 29 removes various types of noises such as an operation sound from a collected sound signal, thereby obtaining a sound signal which is easy for a person to listen to. However, as described above, the noise removal processing according to the present embodiment corresponds to the non-linear signal processing and may, in some cases, cause a discontinuous change in the signal waveform. There is a possibility that a sound signal to which such non-linear signal processing is applied causes sound distortion and adversely affects the accuracy of speech recognition processing.

Therefore, in the present embodiment, the sound signal processing apparatus 10 transmits, to the information processing apparatus 50, both a collected sound signal before the non-linear signal processing (here, the noise removal processing executed by the noise removal section 29) is applied and a collected sound signal after the non-linear signal processing is applied. With this configuration, the information processing apparatus 50 can use the sound signal to which the non-linear signal processing has been applied for applications, such as voice chat, where a person is listening, while using the sound signal to which the non-linear signal processing has not been applied for mechanical processing such as speech recognition processing. Hereinafter, for the convenience of description, the collected sound signal after the non-linear signal processing is executed (post-execution sound signal) will be referred to as a listening sound signal, and the collected sound signal before the non-linear signal processing is executed (pre-execution sound signal) will be referred to as a recognition sound signal. It is noted that the information processing apparatus 50 may use these sound signals for applications other than those described here. Further, the non-linear signal processing only applied to the listening sound signal here is not limited to the noise removal processing and may include other signal processing.

The listening sound signal and the recognition sound signal may be transmitted to the information processing apparatus 50 independent of each other at different timings. In the present embodiment, however, the sound signal processing apparatus 10 collectively transmits these two types of sound signals to the information processing apparatus 50. Specifically, the sound input/output circuit 11 includes the two signal output sections 32*a* and 32*b*. The signal output section 32*a* and the signal output section 32*b* can respectively output a listening sound signal and a recognition sound signal in parallel with each other. With this configuration, the sound input/output circuit 11 can output the two types of sound signals in the same period. These two types of sound signals are collectively transmitted to the information processing apparatus 50 as one sound signal by the communication circuit 12*a* of the microcontroller 12. That is, the communication circuit 12*a* transmits these two types of sound signals to the information processing apparatus 50 as multi-channel sound signal data, one stored in the L channel and the other stored in the R channel. In this manner, the microcontroller 12 can be implemented by using a publicly-known module complying with the standard such as I2S. Thus, the two types of sound signals can be transmitted in parallel using a method similar to a method in the case of transmitting a normal stereo sound signal.

Moreover, in the present embodiment, in a case where the sound signal processing apparatus 10 transmits the two types of sound signals in parallel, the sound signal processing apparatus 10 performs adjustment such that the sound signals to be transmitted at the same time become sound signals collected at close timings. Specifically, the recognition sound signal is a sound signal after the echo removal processing, which is executed by the echo removal section 28, is applied and before the noise removal processing, which is executed by the noise removal section 29, is provided. Therefore, the recognition sound signal is already ready to be transmitted at the timing when the noise removal processing starts. However, the noise removal processing requires a certain amount of time, and the listening sound signal is not generated until the noise removal processing is completed. In the present embodiment, therefore, the delay processing section 31 temporarily buffers the recognition sound signal and delays the start of its transmission until the time assumed to be required for the noise removal processing elapses.

Figure 5:
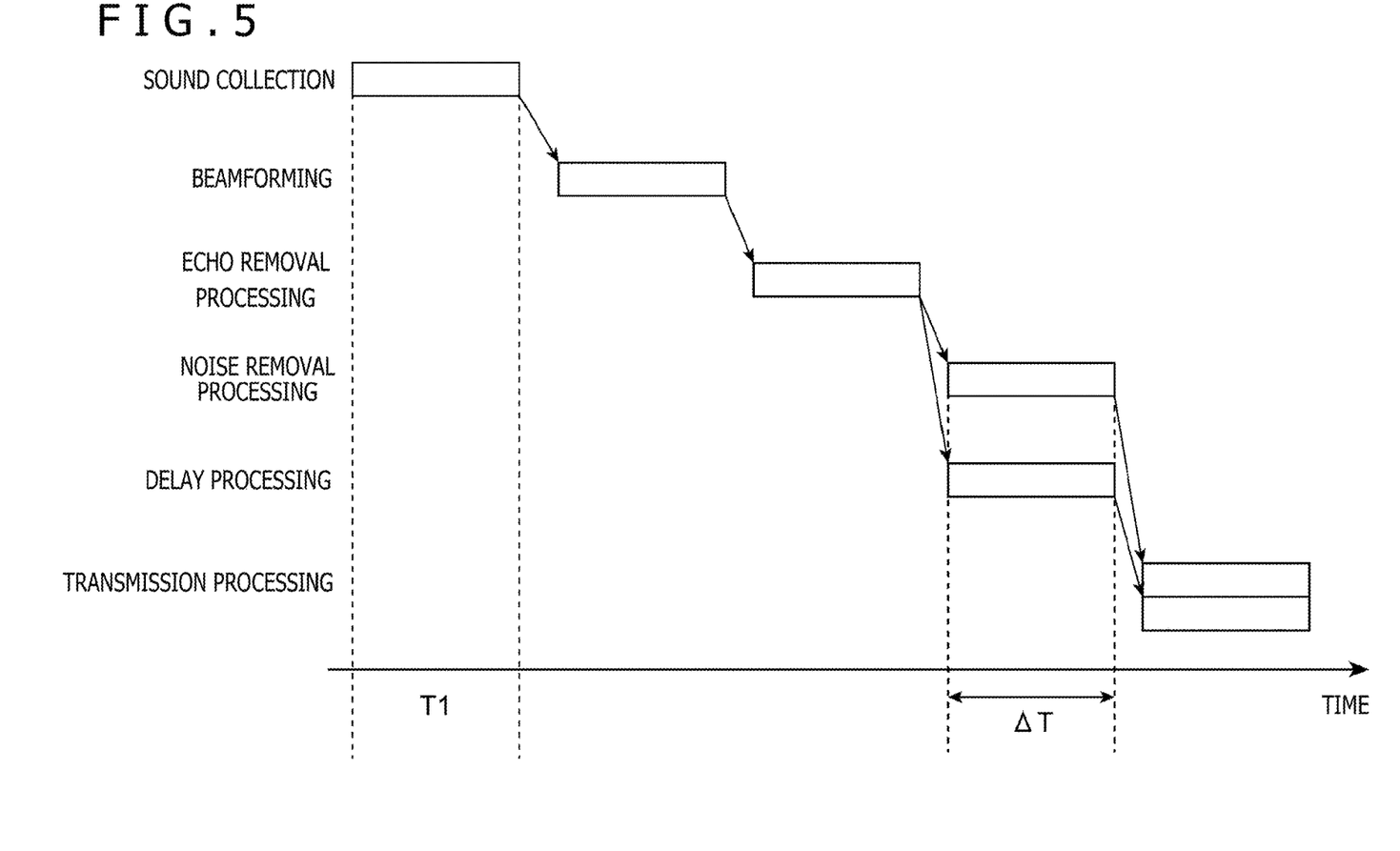
FIG. 5 is a diagram for describing processing of transmitting two types of sound signals by the sound signal processing apparatus according to the embodiment of the present invention.

Under such control, the two types of sound signals to be transmitted in the same period can be sound signals that are collected approximately at the same time. FIG. 5 is a diagram for describing the contents of this control and illustrates a time chart of the processing executed on the sound signal collected during a certain time section T1. As illustrated in the example of this figure, the delay processing section 31 delays the start of transmission of the recognition sound signal by the time ΔT required for the noise removal processing, so that the two types of sound signals corresponding to the same time section are collectively transmitted.

By transmitting the listening sound signal and the recognition sound signal corresponding to the same time section in the same period in this manner, it is possible to improve the transmission efficiency when transmitting the sound signals from the sound signal processing apparatus 10 to the information processing apparatus 50. Specifically, when transmitting the sound signals wirelessly, the microcontroller 12 compresses or encodes the sound signals on the basis of a predetermined sound codec. Here, as described above, in a case where the two types of sound signals, namely, the listening sound signal and the recognition sound signal, are transmitted as a stereo sound signal, the microcontroller 12 performs encoding by the stereo sound codec. At this time, as the correlation between the L-channel sound signal and the R-channel sound signal is higher (that is, both are similar more), the compression efficiency at the time of encoding can increase. Further, in general, the stereo sound codec operates under the assumption that the L-channel sound signal and the R-channel sound signal are data close to each other. Therefore, by using the listening sound signal and the recognition sound signal corresponding to the same time section as the stereo sound signal, it is possible to improve the correlation between the two and perform encoding efficiently.

The communication section 53 of the information processing apparatus 50 receives the sound signals transmitted from the sound signal processing apparatus 10 in the procedure described above. The control section 51 executes processing different from each other on each of the two types of sound signals received. Specifically, the control section 51 extracts the recognition sound signal from one channel of the received stereo sound signal and inputs the recognition sound signal into a speech recognition engine. In this manner, the control section 51 executes speech recognition processing for analyzing the contents of words uttered by the user. At this time, since the recognition sound signal is a signal to which the non-linear signal processing has not been applied, the accuracy of speech recognition can be improved compared with the signal after the non-linear signal processing has been applied.

Further, the information processing apparatus 50 also executes transmission processing of extracting the listening sound signal from the other channel of the same stereo sound signal and transmitting the listening sound signal to another information processing apparatus via a communication network. Another information processing apparatus that has received this listening sound signal causes a speaker or the like to reproduce the sound. Accordingly, the contents spoken by the user of the sound signal processing apparatus 10 can be transmitted in real time to another user at a distant place, realizing a voice call such as voice chat. At this time, since the sound listened to by another user is the sound to which the noise removal processing has been applied, noise such as an operation sound has been removed from the sound and the person can easily listen to the sound.

It is noted that although, in the description above, the sound signal processing apparatus 10 always transmits the two types of sound signals to the information processing apparatus 50, the present embodiment is not limited thereto and the sound signal processing apparatus 10 may switch, in response to a request from the information processing apparatus 50, the type of sound signal to be transmitted. Specifically, in a case where the speech recognition processing is to be executed, the information processing apparatus 50 requests only a recognition sound signal. In a case where the speech recognition processing is not necessary and only voice chat is performed, the information processing apparatus 50 may request only a listening sound signal. In response to such a request, the sound signal processing apparatus 10 switches among a mode in which the two types of sound signals are transmitted in parallel, a mode in which only the recognition sound signal is transmitted, and a mode in which only the listening sound signal is transmitted. Particularly, in a case where only one type of sound signal is transmitted, the transmission efficiency can be improved, compared with a case where the two types of sound signals are transmitted in parallel.

The sound signal processing apparatus 10 according to the embodiment of the present invention described above can increase the accuracy of the noise removal processing by changing the contents of the noise removal processing depending on the presence/absence of an operation input.

Further, the sound signal processing apparatus 10 according to the embodiment of the present invention can transmit, to the information processing apparatus 50, both the recognition sound signal and the listening sound signal based on the same collected sound signal. Accordingly, the information processing apparatus 50 can execute processing of transmitting to the outside to allow a person to listen, speech recognition processing, and the like using the sound signals on which appropriate signal processing has been executed individually.

It is noted that, in the present embodiment, information indicating the presence/absence of an operation input received by the operation input reception section 30 is used for the noise removal processing. Therefore, it is desirable that the noise removal processing be executed by the sound signal processing apparatus 10, instead of the information processing apparatus 50. This is because if there is a gap between the timing when the user actually performs an operation input and its operation sound is generated and the timing when the information processing apparatus 50 receives the operation input, it becomes difficult to accurately execute the processing of removing noise resulting from the operation sound.

It is noted that the embodiment of the present invention is not limited to the embodiment described above. For example, although the sound signal processing apparatus 10 is a controller for a home-use game machine in the above description, the sound signal processing apparatus 10 is not limited thereto. The sound signal processing apparatus 10 may be any of various devices such as an electronic device including a microphone, a speaker, and operation buttons in the same housing. Further, the processing executed by the information processing apparatus 50 in the above description may be distributed to a plurality of computers and executed thereby. As an example, the information processing apparatus 50 may include a client apparatus and a server apparatus that are connected to each other via a communication network. In this example, the client apparatus is directly connected to the sound signal processing apparatus 10 and receives the two types of sound signals from the sound signal processing apparatus 10, while the server apparatus receives one or both of these two types of sound signals from the client apparatus and executes predetermined processing on the received sound signal(s). Further, the processing described as being executed by the server apparatus here may be further distributed and executed by a plurality of computers.

Further, the hardware configuration and circuit configuration of the sound signal processing apparatus 10 described above are merely examples, and the signal processing flow may be different from the one described above. For example, the echo removal section 28 may execute the echo removal processing on a collected sound signal collected by a single microphone element. Further, the beamforming processing may be executed after the echo removal processing is executed on each of a plurality of collected sound signals obtained by the plurality of microphone elements. Further, if necessary, sound signal processing such as downsampling may be executed on a sound signal. Moreover, in the present embodiment, a listening sound signal is generated by additionally executing the noise removal processing on a recognition sound signal, and the noise removal processing is not executed on the recognition sound signal. Alternatively, after signal processing that is relatively unlikely to affect the speech recognition processing is applied to the recognition sound signal, the recognition sound signal may be transmitted to the information processing apparatus 50.

Further, some of the functions implemented by the sound input/output circuit 11 in the above description may be implemented outside the sound input/output circuit 11. For example, the functions such as the D/A converters 24a and 24b and the A/D converters 26a and 26b, which have been implemented by the sound input/output circuit 11 in the above description, may be implemented by another circuit element provided outside the sound input/output circuit 11. Further, a part of the sound signal processing described as being executed by the DSP 11a of the sound input/output circuit 11 may be executed in the microcontroller 12. On the other hand, at least a part of the processing executed by the microcontroller 12, such as the sound signal encoding processing, in the above description, may be executed by the sound input/output circuit 11. Further, although each of the sound input/output circuit 11 and the microcontroller 12 is a single integrated circuit in the above description, each of the sound input/output circuit 11 and the microcontroller 12 may be implemented by a plurality of integrated circuits. Further, the functions of the sound input/output circuit 11 and the microcontroller 12 may be implemented by one integrated circuit.

REFERENCE SIGNS LIST

1 Sound signal processing system, 10 Sound signal processing apparatus, 11 Sound input/output circuit, 11a DSP, 12 Microcontroller, 12a Communication circuit, 12b Antenna, 13 Speaker, 14 Headphone terminal, 15 Microphone, 15a, 15b Microphone element, 16 Operation button, 21a, 21b Signal input section, 22 Speaker sound quality adjustment section, 23 Selector, 24a, 24b D/A converter, 25a, 25b, 25c Amplifier, 26a, 26b A/D converter, 27 Beamforming processing section, 28 Echo removal section, 29 Noise removal section, 30 Operation input reception section, 31 Delay processing section, 32a, 32b Signal output section, 50 Information processing apparatus, 51 Control section, 52 Storage section, 53 Communication section

The invention claimed is:

1. A sound signal processing system comprising:
   a sound signal processing apparatus; and
   an information processing apparatus, the apparatuses being communicatively connected to each other,
   wherein the sound signal processing apparatus includes
   a signal processing section configured to execute non-linear signal processing on a collected sound signal collected by a microphone, and
   a transmission section configured to transmit, to the information processing apparatus, both a pre-execution sound signal before the non-linear signal processing is executed and a post-execution sound signal after the non-linear signal processing is executed, and
   wherein the information processing apparatus includes
   a reception section configured to receive the pre-execution sound signal and the post-execution sound signal from the sound signal processing apparatus, and
   a processing section configured to execute first processing on the pre-execution sound signal and execute second processing on the post-execution sound signal, the second processing being different from the first processing, and
   wherein the signal processing section is configured to execute the non-linear signal processing on the collected sound signal when an operation input signal is received by the signal processing section, and configured to not execute the non-linear signal processing on the collected sound signal when the operation input signal is not received by the signal processing section,
   wherein the operation input signal is generated by an operation input to the sound signal processing apparatus by a user of the sound signal processing apparatus, the operation input causing an audible input sound collected by the microphone, and
   wherein the signal processing section is configured to receive information for identifying which operation button among a plurality of operation buttons has been operated, and execute the non-linear processing with contents that vary depending on the identified operation button.

2. The sound signal processing system according to claim 1, wherein the non-linear signal processing includes noise removal processing for removing noise included in the collected sound signal.

3. The sound signal processing system according to claim 1, wherein
   the signal processing section executes linear signal processing on the collected sound signal prior to the non-linear signal processing, and
   the transmission section transmits, as the pre-execution sound signal, a sound signal after the linear signal processing is executed, and transmits, as the post-execution sound signal, a sound signal after the non-linear signal processing is further executed on the sound signal after the linear signal processing is executed.

4. The sound signal processing system according to claim 1, wherein
   after a predetermined time corresponding to a time required for the non-linear signal processing elapses, the signal processing section outputs, to the transmission section, the pre-execution sound signal before the non-linear signal processing is executed, and the transmission section transmits the pre-execution sound signal output after the predetermined time elapses and the post-execution sound signal to the information processing apparatus in parallel.

5. The sound signal processing system according to claim 1, wherein the operation input signal results from an operation button of the sound signal processing apparatus being operated by a user of the sound signal processing apparatus, the operation causing an audible sound of the button operation.

6. The sound signal processing system according to claim 1, wherein the second processing includes transmission processing for human listening applications, and the first processing includes speech recognition processing.

7. A sound signal processing apparatus configured to be communicatively connected to an information processing apparatus, the sound signal processing apparatus comprising:
- a signal processing section configured to execute non-linear signal processing on a collected sound signal collected by a microphone; and
- a transmission section configured to transmit, to the information processing apparatus, both a pre-execution sound signal before the non-linear signal processing is executed and a post-execution sound signal after the non-linear signal processing is executed;
- wherein the signal processing section is configured to execute, with first contents, the non-linear signal processing on the collected sound signal when an operation input signal is received by the signal processing section, and configured to execute, with second contents, the non-linear signal processing on the collected sound signal when the operation input signal is not received by the signal processing section,
- wherein the operation input signal is generated by an operation input to the sound signal processing apparatus by a user of the sound signal processing apparatus, the operation input causing an audible input sound collected by the microphone, and
- wherein the signal processing section is configured to receive information for identifying which operation button among a plurality of operation buttons has been operated, and execute the non-linear processing with contents that vary depending on the identified operation button.

8. An information processing apparatus configured to be communicatively connected to a sound signal processing apparatus, the information processing apparatus comprising:
- a reception section configured to receive, from the sound signal processing apparatus, both a pre-execution sound signal before non-linear signal processing is executed on a collected sound signal collected by a microphone and a post-execution sound signal after the non-linear signal processing is executed on the collected sound signal; and
- a processing section configured to execute first processing on the pre-execution sound signal and execute second processing on the post-execution sound signal, the second processing being different from the first processing;
- wherein the signal processing section is configured to execute the non-linear signal processing on the collected sound signal when an operation input signal is received by the signal processing section, and configured to not execute the non-linear signal processing on the collected sound signal when the operation input signal is not received by the signal processing section;
- wherein the operation input signal is generated by an operation input to the sound signal processing apparatus by a user of the sound signal processing apparatus, the operation input causing an audible input sound collected by the microphone; and
- wherein the signal processing includes receiving information for identifying which operation button among a plurality of operation buttons has been operated, and execute the non-linear processing with contents that vary depending on the identified operation button.

9. A sound signal processing method comprising:
executing non-linear signal processing on a collected sound signal collected by a microphone; and
transmitting, to an information processing apparatus, both a pre-execution sound signal before the non-linear signal processing is executed and a post-execution sound signal after the non-linear signal processing is executed;
wherein the signal processing section is configured to execute, with first contents, the non-linear signal processing on the collected sound signal when an operation input signal is received by the signal processing section, and configured to execute, with second contents, the non-linear signal processing on the collected sound signal when the operation input signal is not received by the signal processing section;
wherein the operation input signal is generated by an operation input to the sound signal processing apparatus by a user of the sound signal processing apparatus, the operation input causing an audible input sound collected by the microphone; and
wherein the signal processing includes receiving information for identifying which operation button among a plurality of operation buttons has been operated, and execute the non-linear processing with contents that vary depending on the identified operation button.

* * * * *